(12) United States Patent
Sonobe

(10) Patent No.: US 6,437,540 B2
(45) Date of Patent: Aug. 20, 2002

(54) BATTERY PACK

(75) Inventor: Satoshi Sonobe, Utsunomiya (JP)

(73) Assignee: NEC Mobile Energy Corporation, Utsunomiya (JP)

( * ) Notice: Subject to any disclaimer, the term of this patent is extended or adjusted under 35 U.S.C. 154(b) by 0 days.

(21) Appl. No.: 09/777,860

(22) Filed: Feb. 7, 2001

(30) Foreign Application Priority Data

Feb. 7, 2000 (JP) ........................................ 2000-028496

(51) Int. Cl.$^7$ ................................................ H02J 7/00
(52) U.S. Cl. ........................................ 320/134; 320/136
(58) Field of Search ............................. 320/134, 136, 320/132, 137, 116, 118, 119

(56) References Cited

U.S. PATENT DOCUMENTS

| | | | | |
|---|---|---|---|---|
| 5,739,671 A | * | 4/1998 | Hamada | 320/149 |
| 6,069,468 A | * | 5/2000 | Sonobe | 320/106 |
| 6,075,343 A | * | 6/2000 | Hsu | 320/134 |
| 6,172,482 B1 | * | 1/2001 | Eguchi | 320/134 |

* cited by examiner

Primary Examiner—Gregory Toatley
Assistant Examiner—Lawrence Luk
(74) Attorney, Agent, or Firm—Armstrong, Westerman & Hattori, LLP

(57) ABSTRACT

A battery pack, using a battery having one or more cells as a power source and for connecting power to an external host device, and including charging/discharging apparatus connected in series with the battery and for performing charging and discharging, current detecting apparatus for detecting charging and discharging current, voltage detecting apparatus for detecting voltage, temperature detecting means for detecting temperature, and a controller, whereby the controller is operated in such manner that it turns the state from at least one of charging state, discharging state, charging stop state, and discharging stop state to another state by controlling the charging/discharging apparatus based on the charging/discharging current, the voltage and the temperature as detected, and the state information is transmitted to the external host device when there is a request or at regular interval or when there is state transition, and state transition such as a charging/discharging state or a stop state of the battery pack controlled according to charging/discharging current, voltage, and temperature is controlled and information of state transition can be managed and controlled by the external host device.

17 Claims, 5 Drawing Sheets

FIG. 2

| Judgment flag | Condition of judgment | YES | NO |
|---|---|---|---|
| Fic1 | $Ic \geq Icrf1$ | | |
| Fic2 | $Ic \geq Icrf2$ | | |
| Fid | $Id \geq Idrf1$ | | |
| Fia | $Ia \leq Iarf1$ | | |
| Fvb1 | $Vb \leq Vbrf1$ | | |
| Fvb2 | $Vb \leq Vbrf2$ | | |
| Fvb3 | $Vb \geq Vbrf3$ | | |
| Fvb4 | $Vb \leq Vbrf4$ | 1 | 0 |
| Fvb5 | $Vb \leq Vbrf5$ | | |
| Fvb6 | $Vb \geq Vbrf6$ | | |
| Fhb1 | $Hb \geq Hbrf1$ | | |
| Fhb2 | $Hb \leq Hbrf2$ | | |
| Fhb3 | $Hb \geq Hbrf3$ | | |
| Ftc1 | $Tc \geq Tcrf1$ | | |
| Ftc2 | $Tc \geq Tcrf2$ | | |
| Fts | $Ts \geq Tsrf1$ | | |
| Fo | Disconnected | | |

FIG. 3

| State flag | Description of state | Charging FET | Discharging FET | Spare charging FET |
|---|---|---|---|---|
| Fsta | Charging state | ON | ON | |
| Fsta1 | Normal charging state | ON | ON | |
| Fsta2 | Charging temporary stop state | OFF | ON | |
| Fstb | Discharging state | ON | ON | |
| Fstc | Charging stop state | OFF | ON | |
| Fstc1 | Charging stop state based on temperature | OFF | ON | |
| Fstc2 | Charging stop state based on abnormal current | OFF | ON | |
| Fstc3 | Charging stop state based on abnormal temperature | OFF | ON | |
| Fstc4 | Charging stop state based on full voltage | OFF | ON | |
| Fstd | Discharging stop state | ON | OFF | |
| Fste | Non-operation state | OFF | OFF | |
| Fstf | Spare charging state | OFF | OFF | ON |
| Fstg | Spare charging stop state | OFF | OFF | OFF |

BATTERY PACK

BACKGROUND OF THE INVENTION

1. Field of the Invention

The present invention relates to a battery pack, using a battery comprising one or more cells as a power source and for connecting power to an external host device.

2. Description of the Related Art

A battery pack comprises one or more cells (secondary battery) of a charging type, and it is used as a power source for an electronic device such as portable telephone, notebook-sized personal computer, CD or DVD player, digital camera, etc. In an external host device such as a portable electronic device using a battery pack of this type as the power source, it is essential to facilitate the control and management to identify the condition of the battery pack. In case of trouble, it is necessary to promptly judge how to restore the condition to normal. However, in a battery pack of a conventional type, it has been not possible to fulfill these functions.

SUMMARY OF THE INVENTION

To solve the above problems, it is an object of the present invention to provide a battery pack, by which it is possible to control state transition such as a charging/discharging state or a stop state and to monitor information on state transition of the battery pack at the external host device.

To attain the above object, the present invention provides a battery pack, using a battery comprising one or more cell as a power source and for connecting power to an external host device, where said battery pack comprises charging/discharging means connected in series to the battery and for performing charging and discharging, current detecting means for detecting the charging and the discharging current, voltage detecting means for detecting voltage, temperature detecting means for detecting temperature, and control means, whereby the control means is operated in such manner that it is turned from at least one of charging state, discharging state, charging stop state or discharging stop state to another state by controlling the charging/discharging means according to the charging/discharging current, voltage and temperature as detected, and information of said state transition is transmitted to the external host device at least once when there is a request or at regular intervals or when there is state transition.

Further, the charging/discharging means comprises a switch for charging the battery and a switch for discharging the battery. The control means comprises a switch for spare charging, whereby, in a charging state or a discharging state, the switch for charging and the switch for discharging are both turned on. In the charging stop state, the switch for charging is turned off and the switch for discharging is turned on. In the discharge stop state, the switch for charging is turned on and the switch for discharging is turned off, and it comprises a spare charging switch arranged in parallel to the charging switch and the discharging switch and for charging micro current or a very small amount of current. The control means is operated in such a manner that, when the voltage is lower than the preset value, the charging switch and the discharging switch are turned off and only the spare charging switch is turned on, and it is turned to a spare charging state. When the voltage is not higher than the preset voltage value even when charging has been performed with the preset charging current under the spare charging state, the control means turns off the spare charging switch and it is turned to a spare charging stop state. When it has been detected that the connection with the external host device is disconnected, it is turned to system disconnection. The charging switch and the discharging switch are both turned off, and it is turned to a non-operation state.

Also, the control means is operated in such a manner that, when the voltage is compared with the preset value and pulse charging is performed, and when average current in the preset period of time is lower than the preset value, it is turned to a charging stop state and it is defined as a charging stop state based on full charging detection. Also, when the charging switch is turned off and the discharging switch is turned on in the charging temporary stop state, and when this charging temporary state is longer than the preset period of time, it is turned to the charging stop state, and this is defined as a charging stop state based on full charging detection. In the charging stop state based on the full charging detection, it is turned to the charging state under the condition that the charging ratio is lower than the preset value. In the charging state, it is turned to the charging stop state under the condition that the charging current is higher than the preset value, and this state is defined as a charging stop state based on abnormal current. Also, it is turned to the charging stop state under the condition that the cell voltage is lower than the preset value even when the charging time is longer than the preset time, and this state is defined as a charging stop state based on abnormal charging time. Also, in the charging stop state based on the full charging detection, in the charging stop state based on abnormal current, and in the charging stop state based on abnormal charging time, it is turned to discharging state under the condition that discharging has been detected, and it is turned to the non-operation state under the condition that system disconnection has been detected.

Also, the control means is operated in such a manner that, in the charging state, it is turned to a charging stop state tinder the condition that the cell temperature is higher than the preset value, and this state is defined as a charging stop state based on temperature. Also, under the condition that the cell temperature is lower than the preset value, it is turned from the charging stop state based on the temperature to the charging state. In the spare charging state, it is turned to a non-operation state under the condition that the cell voltage is higher than the preset value and system disconnection has been detected. In the discharging state, it is turned to the discharging stop state under the condition that eh cell temperature is higher than the preset value, and this state is defined as a discharging stop state based on abnormal temperature. In the discharging state, it is turned to discharging stop state under the condition that the discharging current is higher than the preset value, and this state is defined as a discharging stop state based on abnormal current.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

FIG. 2 is a table of judgment flags, showing the results of judgment under various conditions of state transition control;

FIG. 3 is a table of an arrangement example of state flags to maintain the state under transition control;

DESCRIPTION OF THE PREFERRED EMBODIMENTS

Figure 1:
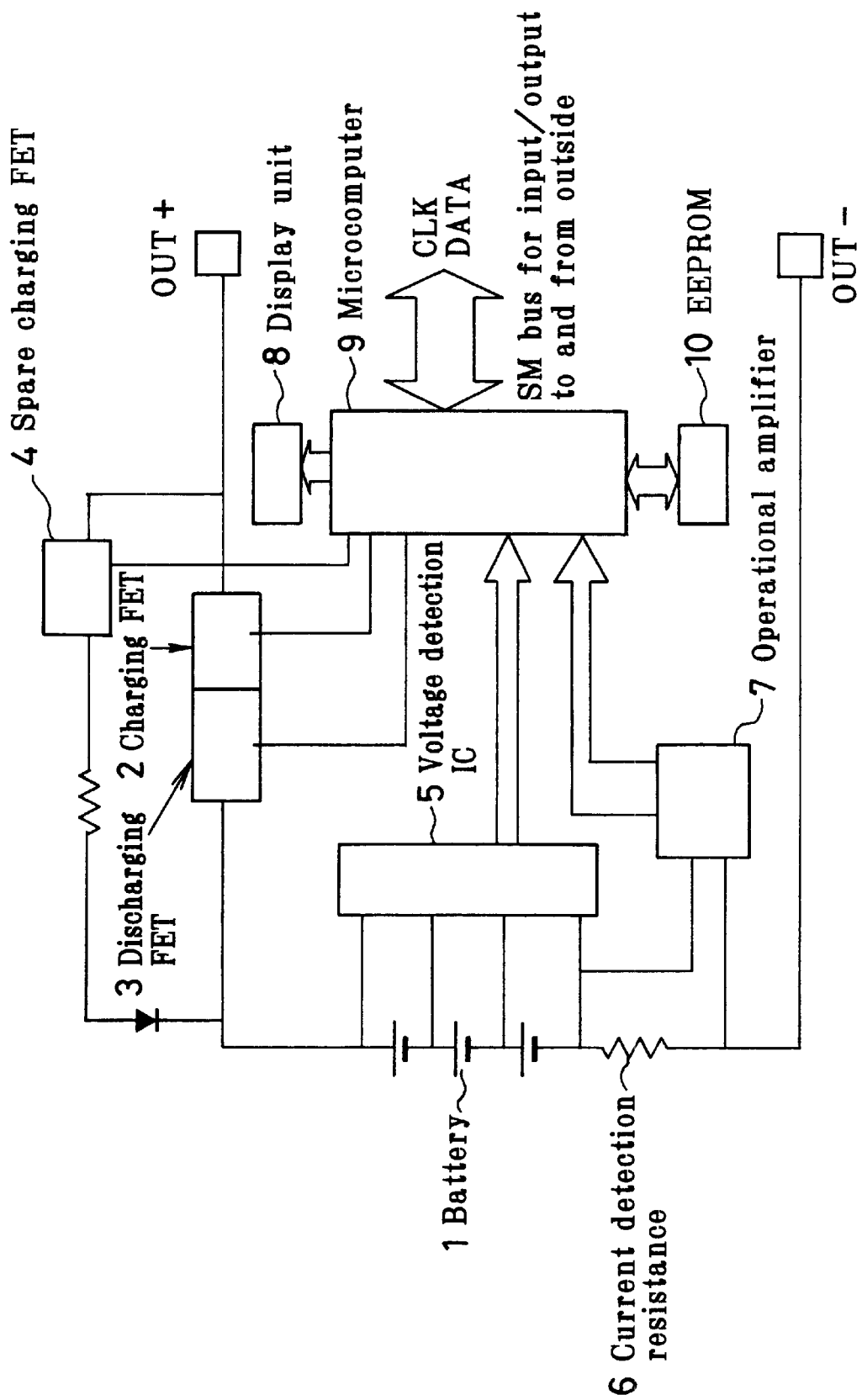
FIG. 1 is a block diagram showing an embodiment of a battery pack according to the present invention.

Description will be given below of an embodiment of the preset invention referring to the attached drawings. FIG. 1 shows an embodiment of a battery pack according to the present invention. Reference numeral 1 denotes a battery, 2 a charging FET, 3 a discharging FET, 4 a spare charging FET, 5 a voltage detection IC, 6 a current detection resistance, 7 an operational amplifier, 8 a display unit, 9 a microcomputer, and 10 an EEPROM.

In FIG. 1, the battery 1 comprises one or more cells. The charging FET 2 is a switching element for charging the battery 1, and the discharging FET 3 is a witching element for discharging the battery 1. The spare charging FET 4 is arranged in parallel to the charging FET 2 and the discharging FET 3 and it is a switching element for charging the battery I with micro current or a very small amount of current. The voltage detection IC 5 detects battery voltage or cell voltage Vb. The current detection resistance 6 and the operational amplifier 7 detect a charging current Ic and a discharging current Id, respectively. The microcomputer 9 is a computer for control, which compares various values with preset values and makes judgements. These values to be compared with the preset values include the battery voltage or the cell voltage Vb detected at the voltage detection IC 5, the charging current Ic or the discharging current Id detected at the current detecting resistance 6 and the operational amplifier 7, and a cell temperature Hb detected by means such as a temperature sensor (not shown). It also judges connecting condition with an external host equipment or device (i.e., whether or not the system is disconnected) and controls state transition of the battery pack by performing on-off control of the spare charging FET 4. In the state transition control, transition operation is performed from the following four types of states to another state: a charging state "a" where the charging FET 2 and the discharging FET 3 are turned on and the battery pack detects a charging current higher than a preset value, a discharging state "b" where the charging FET 2 and the discharging FET 3 are turned on and the battery pack detects discharging current higher than a preset value, a charging stop state "c" where the charging FET 2 is turned off and the discharging FET 3 is turned on, and a discharging stop state "d" where the charging FET 2 is turned on and the discharging FET 3 is turned off. The display unit 8 displays the state of the battery pack and the details of the setting. In the EEPROM 10, various types of control information for controlling state transition of the battery pack are stored.

The microcomputer 9 performs transition operation from a state to another state according to voltage, current and temperature as detected and to a signal from the external host device. Further, upon request from the eternal host device or at regular interval, it transmits code data to show the current state of the battery pack. Also, the microcomputer 9 has a function of detecting disconnection from the external host device. When disconnection is detected, it is turned to a non-operation state "e" where the charging FET 2 and the discharging FET 3 are turned off beside the four types of state "a" to "d" as described above. Here, the term "disconnection" means that it is disconnected or separated from the external host device.

Next, a description will be provided of concrete examples of state transition control and transition to each of these types of state.

As described above, according to the present invention, the battery voltage or the cell voltage Vb, the charging current Ic, the discharging current Id, and the cell temperature Hb are compared with the preset values and judgement is made to control state transition. FIG. 2 shows examples of judgment flags to maintain the results of comparison when this control is performed. In FIG. 2, a judgment flag Fic1 is a flag which maintains "1" when the charging current Ic is higher than a preset value Icrf1. A judgment flag Fic2 is a flag which maintains "1" when the charging current Ic is higher than a preset value Icrf2. A judgment fag Fid is a flag which maintains "1" when the discharging current Id is higher than a preset value Idrf1, and a judgment flag Fia is a flag which maintains "1" when an average current Ia is lower than a preset value Iarf1. Similarly, each of judgment flags Fvb1, Fvb2, Fvb3, Fvb4, Fvb5 and Fvb6 is a flag which maintains "1", respectively, when the battery voltage or the cell voltage Vb is lower than a preset value Vbrf1, when it is lower than a preset value Vbrf2, when it is higher than a preset value Vbrf3, when it is lower than a preset value Vbrf4, when it is lower than a preset value Vbrf5, and when it is higher than a preset value Vbrf6. Each of judgment flags Fhb1, Fhb2, and Fhb3 is a flag which maintains "1", respectively, when the cell temperature Hb is higher than a preset value Hbrf1, when it is lower than a preset value Hbrf2, and when it is higher than a preset value Hbrf3. Judgement flags Ftc1 and Ftc2 are flags which maintain "1" when a charging time Tc, during which the charging current Ic flows for more than a preset value Iorf1, is longer than a preset time Tcrf1 or when normal charging time Tc is longer than a preset time Tcrf2 under a spare charging state "f" where the charging FET 2 and the discharging FET 3 are turned off and the spare charging FET 4 is turned on. A judgment flag Tts is a flag which maintains "1" when a period of time Ts in a charging temporary stop state a2 goes beyond and is longer than a preset time Tsrf1. A judgment flag Of is a flag which maintains "1" when system disconnection has been detected.

Figure 4:
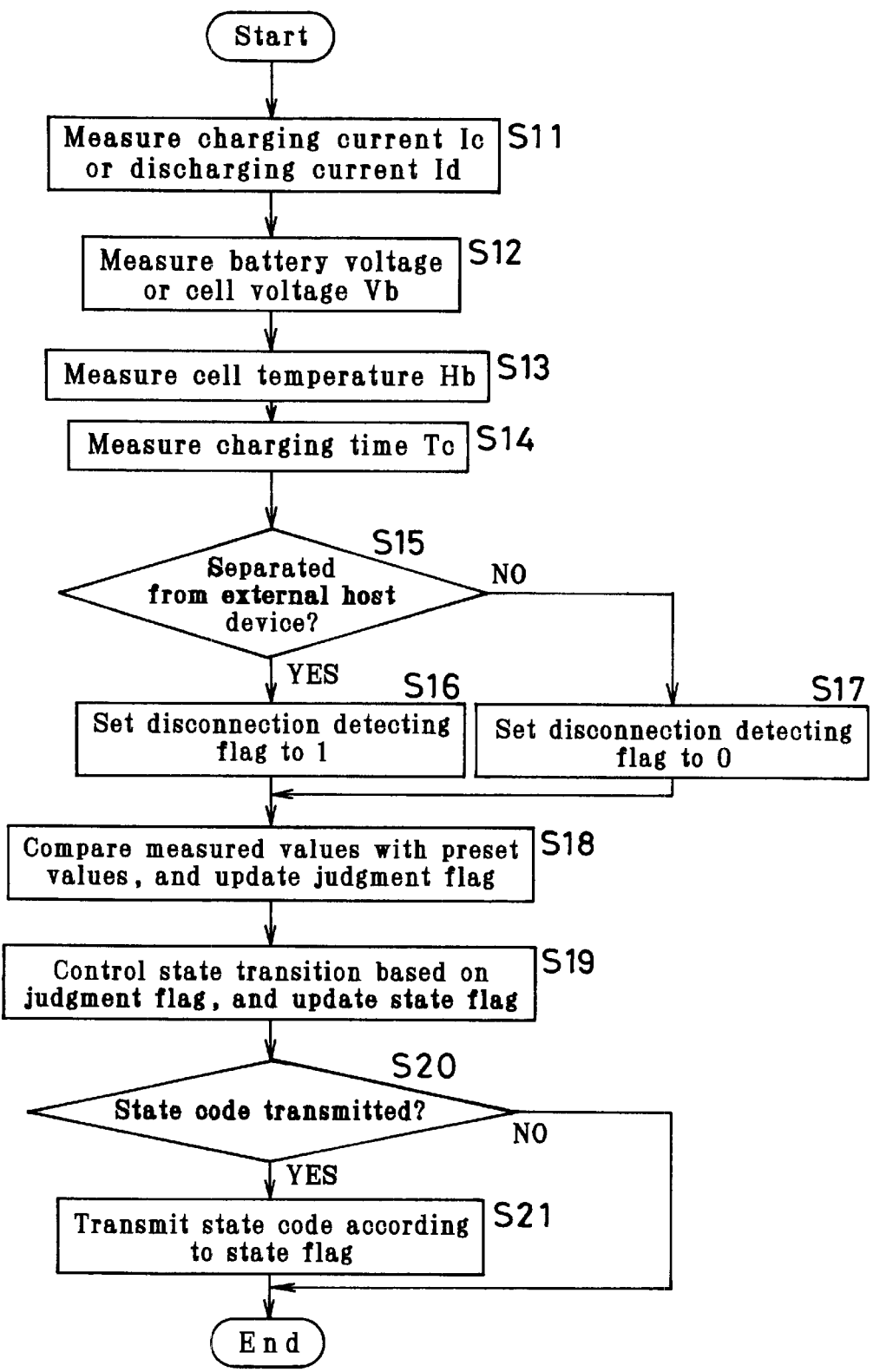
FIG. 4 is a flow chart to explain an example of processing to perform state transition control.

In the state transition control, when operation is started at regular interval by a clock as shown in FIG. 4, for instance, the charging current Ic or the discharging current Id is measured (Step S11). Then, the battery voltage or the cell voltage Vb is measure (Step S12). Further, the cell temperature Hb is measured (Step S13), and the charging time Tc is determined (Step S14). Also, it is judged whether or not it is separated and disconnected from the external host device (Step S15). If separated, the judgement flag Of for disconnection is turned to 1 (Step S16). If it is not separated, the judgment flag for disconnection is turned to 0 (Step S17). Next, the measured values Ic, Id, Vb, Hb and Tc are compared with the preset values Icrf1, Icrf2, Idrf1, Iarf1, Vbrf1 to Vbrf6, Hbrf1 to Hbrf3, Tcrf1, Tcrf2 and Tsrf1, respectively. Then, the judgement flags Fic1, Fic2, Fid, Fia, Fvb1 to Fvb6, Fhb1 to Fhb3, Ftc1, Ftc2, and Fts are updated (Step S18). Then, based on these judgment flags, state transition is controlled, and transition state flag is updated (Step S19). In this case, it is judged whether it is necessary to transmit the state code or not (Step S20). If it is necessary, based on the maintaining condition of the state flag, the state code is transmitted (Step S21). This judgement is made at the request from the external host device or at regular interval as described above.

In the state transition control, when operation is started at regular interval by a clock as shown in FIG. 4, for instance, the charging current Ic or the discharging current Id is measured (Step S11). Then, the battery voltage or the cell voltage Vb is measured (Step S12). Further, the cell temperature Hb is measured (Step S13), and the charging time Tc is determined (Step S14). Also, it is judged whether it is separated and disconnected from the external host device (Step S15) or not. If separated, the judgement flag Of for disconnection is turned to 1 (Step S16). If it is not separated, the judgment flag for disconnection is turned to 0 (Step S17). Next, the measured values Ic, Id, Vb, Hb and Tc are compared with the preset values Icrf1, Icrf2, Idrf1, Iarf1, Vbrf1 to Vbrf6, Hbrf1 to Hbrf3, Tcrf1, Tcrf2 and Tsrf1 respectively. Then, the judgment flags Fic1, Fic2, Fid, Fia, Fvb1 to Fvb6, Fhb1 to Fhb3, Ftc1, Ftc2, and Fts are updated (Step S18). Then, based on these judgment flags, state transition is controlled, and transition state flag is updated (Step S19). In this case, it is judged whether it is necessary to transmit the state code or not (Step S20). If it is necessary, based on the maintaining condition of the state flag, the state code is transmitted (Step S21). This judgment is made at the request from the external host device or at regular interval as described above.

Figure 5:
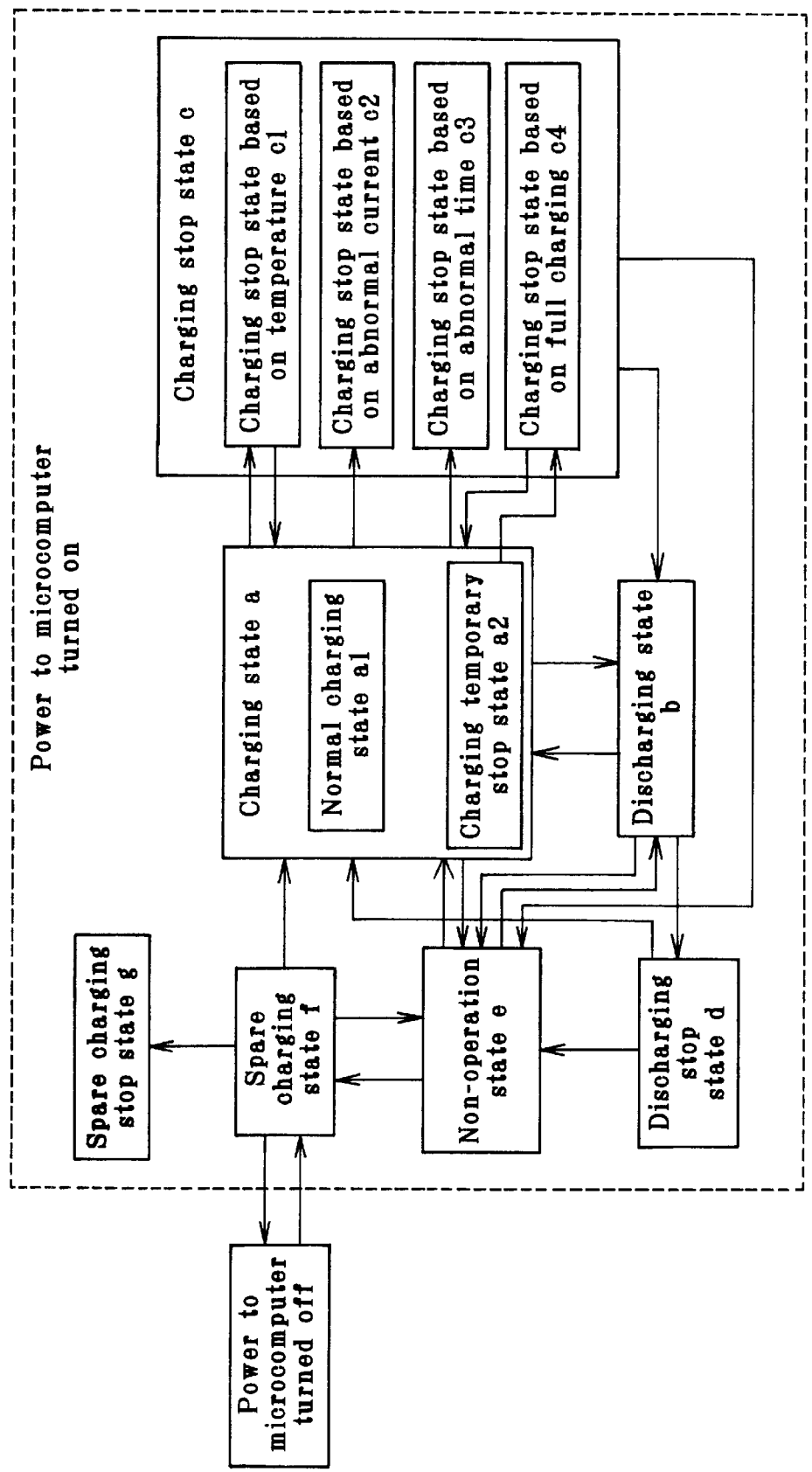
FIG. 5 is a block diagram of an example of state transition.

FIG. 5 shows examples of state transition. Description will be given below on concrete examples of state transition control.

(1) In case the battery voltage or the cell voltage Vb is lower than the preset value Vbrf1 (the judgment flag Fvb1 is set to 1), power to the microcomputer is cut off. Under the condition that the battery pack has been charged, the supply of the power to the microcomputer is resumed. In this case, under the condition that the battery voltage or the cell voltage Vb is lower than the preset value Vbrf2 (the judgement flag Fvb2 is set to 1), the charging FET 2 and the discharging FET 3 are turned off, and the spare charging FET 4 is turned on, and it is turned to the spare charging state "f". Also, under the condition that the microcomputer has been started, it is turned to the spare charging state "f". Further, under the condition that a predetermined data is not written to a given address of nonvolatile memory, the microcomputer writes initial data to the nonvolatile memory.

(2) In the spare charging state "f", even though the charging time Tc, during which the charging current Ic is higher than the preset value Icrf1 (the judgment flag Fic1 is set to 1), is longer than the preset time Tcrf1 (the judgment flag Ftc1 is set to 1), if the cell voltage Vb is lower than the preset value Vbrf2 (the judgment flag Fvb2 is set to 1), all of the charging FET2, the discharging FET3 and the spare charging FET 4 are turned off, and it is turned to the spare charging stop state "g". The purpose of this operation is that charging and discharging are turned to unable status and the battery pack is turned to a status not suitable for the use when the cell voltage is not increased even when it is charged due to the causes such as short-circuiting inside the cell.

(3) Pulse charging is performed by alternately turning from a normal charging state a1 to a charging temporary stop state a2 or vice versa. (In the normal charging state a1, the charging FET 2 and the discharging FET 3 are both turned on, and in the charging temporary stop state a2, the charging FET 2 is turned off, and the discharging FET 3 is turned on.) Under the condition that the cell voltage Vb is higher than the preset value Vbrf3 (e.g. 4.25 V) (the judgment flag Fvb3 is set to 1), it is turned to the normal charging state a1. Under the condition that the cell voltage Vb is lower than the preset value Vbrf4 (e.g. 4.20 V) (the judgment flag Fvb4 is set to 1), it is turned to the charging temporary stop state a2.

(4) Under the condition that the period of time Ts, during which the average current Ia in a preset period of time is lower than the preset value Iarf1 (the judgment flag Fia is set to 1) or it is in the charging temporary stop state a2, is longer than the preset time Tsrf1 (the judgment flag Fts is set to 1), it is turned to the charging stop state "c". This state is defined as a charging stop state c4 based on the full charging detection. In the charging stop state c4 based on the full charging detection, under the condition that the charging ratio is lower than a preset value, it is turned to the charging state "a".

(5) In the charging state "a", under the condition that the cell temperature Hb is higher than the preset value Hbrf1 (the judgment flag Fhb1 is set to 1), it is turned to the charging stop state "c", and this state is defined as a charging stop state c1 based on the temperature. Then, under the condition that the cell temperature Hb is lower than the preset value Hbrf2 (the judgment flag Fhb2 is set to 1), it is turned from the charging stop state c1 based on the temperature to the charging state "a".

(6) In the charging state "a", under the condition that the charging current Ic is higher than the preset value Icrf2 (the judgement flag Fic2), it is turned to the charging stop state "c", and this state is defined as a charging stop state c2 based on abnormal current.

(7) In the charging state "a", under the condition that the cell voltage Vb is lower than the preset value Vbrf5 (the judgment flag Fvb5 is set to 1) and does not reach full charging, even when the charging time Tc is longer than the preset time Tcrf2 (the judgment flag Ftc2 is set to 1), it is turned to the charging stop state "c", and this state is defined as a charging stop state c3 based on abnormal charging time.

(8) In the charging stop state c2 based on abnormal current, in the charging stop state c3 based on abnormal charging time, and in the charging stop state c4 based on full charging detection, it is turned to the discharging state "b" under the condition that discharging has been detected, or it is turned to the non-operation state "e" under the condition that disconnection from the system has been detected.

(9) In the spare charging state "f", under the condition that the cell voltage Vb is higher than the preset value Vbrf6 (the judgment flag Fvb6 is set to 1) and disconnection of the system has been detected (the judgment flag Of is set to 1), it is turned to the non-operation state "e".

(10) In the discharging state "b", under the condition that the cell temperature Hb is higher than the preset value Hbrf3 (the judgment flag Fhb3 is set to 1), it is turned to the charging stop state "d", and this state is defined as a charging stop state based on abnormal temperature.

(11) In the discharging state "b", under the condition that the discharging current Id is higher than the preset value Idrf1 (the judgment flag Fid1 is set to 1), it is turned to the discharging stop state "d", and this state is defined as a discharging stop state d1 based on abnormal current.

The present invention is not limited to the above embodiment, and various changes and modifications can be made. For instance, in the above embodiment, the judgment flags are set. Then, the battery voltage or the cell voltage Vb, the charging current Ic, the discharging current Id, and the cell temperature Hb are compared with the preset values, and the judgment flags are set to control the state transition. This method is simply an illustrative example, and other methods may be applied to control the state transition. Also, in the above embodiment, the code data showing the state is transmitted at regular interval or when there is a request from the external host device, while it is may be designed in such manner that, when it is turned from a state to another state in the state transition, a code data representing the state may be transmitted at least once. This is because, if the data is transmitted at regular interval, the period of application of communication interruption to the external host device is increased. If data is transmitted only when there is a request, this cannot be detected at accurate timing in the abnormal condition. Thus, it is aimed to transmit the state information at the timing as it is turned to the new state. Further, it may be designed in such manner that it is counted how much time has elapsed since it has been turned to the current state, and this count value may be transmitted.

As it is evident from the above description, the present invention provides a battery pack which uses a battery comprising one or more cells as a power source and for connecting the battery to an external host device. The battery pack comprises charging/discharging means connected in series to the battery and used for charging or discharging, current detecting means for detecting charging and discharging current of the battery, voltage detecting means for detecting voltage of the cell, temperature detecting means for detecting temperature of the cell, and control means for transmitting data to the external host device at least once when there is a request or at regular interval, whereby the charging/discharging means is controlled according to the charging/discharging current, voltage and temperature as detected, and it is turned from at least one of the types of state including charging state, discharging state, charging stop state, and discharging stop state to another state. As a result, for the external host device, it is easier to perform management and control of the current state of the battery pack. The state of the battery pack controlled according to the data such as charging/discharging current, voltage and temperature is transmitted to the external host device based on transition information regarding charging state, discharging state, charging stop state and discharging stop state.

Further, the charging/discharging means comprises a switch for charging the battery and a switch for discharging the battery. The control means comprises a switch for spare charging, whereby, in charging state or discharging state, the switch for charging and the switch for discharging are both turned on. The charging stop state, the switch for charging is turned off and the switch for discharging is turned on. In the discharge stop state, the switch for charging is turned on and the switch for discharging is turned off, and it comprises a spare charging switch arranged in parallel to the charging switch and the discharging switch and for charging micro current or very small amount of current. The control means is operated in such manner that, when the voltage is lower than the preset value, the charging switch and the discharging switch are turned off and only the spare charging switch is turned on, and it is turned to the spare charging state. When the voltage is not higher than the preset voltage value even when charging has been performed with the preset charging current under the spare charging state, the control means turns off the spare charging switch and it is turned to a spare charging stop state. When it has been detected that the connection with the external host device is disconnected, it is turned to system disconnection. The charging switch and the discharging switch are both turned off, and it is turned to a non-operation state. Also, it is turned to the charging stop state to match the state transition. The external host device can monitor the current state of the battery pack, and it is possible to judge how to restore to a normal state promptly.

What is claimed is:

1. A battery pack using a battery comprising one or more cells as a power source and for connecting power to an external host device, said battery pack comprising:

charging/discharging means connected in series to said battery and used for charging and discharging;

current detecting means for detecting the charging/discharging current;

voltage detecting means for detecting voltage; and temperature detecting means for detecting temperature, wherein at least charging state, discharging state, charging stop state and discharging stop state can be selected by controlling said charging/discharging means based on the charging/discharging current, the voltage, and the temperature as detected, and it is turned from one of these states to another state, and state transition information is transmitted to the external host device, and wherein said charging/discharging means comprises a charging switch for charging said battery and a discharging switch for discharging said battery, said control means is operated in such manner that it is turned to the charging state or the discharging state when said charging switch and said discharging switch are both turned on and charging current or discharging current higher than a preset value is detected, it is turned to a charging stop state when the charging switch is turned off and the discharging switch is turned on, and it is turned to a discharge stop state when the charging switch is turned on and the discharging switch is turned off.

2. A battery pack according to claim 1, wherein said control means is operated in such manner that it is turned to system disconnection when it has been detected that connection with the external host device is disconnected, and the charging switch and the discharging switch are both turned off at the system disconnection, and this state is turned to a non-operation state.

3. A battery pack according to claim 1, wherein said charging/discharging means comprises a spare charging switch arranged in parallel to the charging switch and the discharging switch and used for charging with micro current, said control means is operated in such manner that the charging switch and the discharging switch are both turned off and only the spare charging switch is turned on when voltage is lower than a preset value, and it is turned to spare charging state.

4. A battery pack according to claim 3, wherein the control means is operated in such manner that the spare charging switch is turned off when the preset voltage value is not reached even when charging has been performed for a preset period of time with the preset amount of charging current in said spare charging state, and it is turned to a spare charging state.

5. A battery pack according to claim 3, wherein said control means is operated in such manner that, in the spare charging state, it is turned to the non-operation state under the condition that the cell voltage is higher than the preset value and system disconnection has been detected.

6. A battery pack according to claim 1, wherein said control means is operated in such manner that, when the voltage is compared with the preset value and pulse charging is performed, it is turned to a charging stop state when the average current during a preset period of time is lower than a preset value, and it is turned to a spare charging stop state based on full charging detection.

7. A battery pack according to claim 1, wherein said control means is operated in such manner that, when the voltage is compared with the preset value and pulse charging is performed, and when the charging temporary stop state where the charging switch is turned off and the discharging switch is turned on is longer than the preset period of time, it is turned to the charging stop state, and it is defined as a charging stop state based on full charging detection.

8. A battery pack according to claim 6 or 7, wherein the control means is operated in such manner that, in the spare charging stop state based on full charging detection, it is turned to the charging state under the condition that the charging ratio is lower than the preset value.

9. A battery pack according to claim 1, wherein said control means is operated in such manner that it is turned to charging stop state under the condition that the charging current is higher than the preset value, and this state is defined as a charging stop state based on abnormal current.

10. A battery pack according to claim 1, wherein said control means is operated in such manner that, in the charging state, it is turned to the charging stop state under the condition that the cell voltage is lower than the preset value even when the charging time is longer than the preset period of time, and this state is defined as a charging stop state based on abnormal charging time.

11. A battery pack according to any one of claim 6, 7, 9 or 10, wherein said control means is operated in such manner that, in the charging stop state based on the full charging detection, in the charge stop state based on abnormal current, and in the charging stop state based on abnormal charging time, it is turned to the discharging state under the condition that the discharging has been detected, and it is turned to the non-operation state under the condition that the system disconnection has been detected.

12. A battery pack according to claim 1, wherein the control means is operated in such manner that, in the charging state, it is turned to the charging stop state under the condition that the cell temperature is higher than the preset value, and this state is defined as a charging stop state based on temperature.

13. A battery pack according to claim 12, wherein the control means is operated in such manner that it is turned from the charging stop state based on the temperature to the charging state under the condition that the cell temperature is lower than the preset value.

14. A battery pack according to claim 1, wherein the control means is operated in such manner that, in the charging state, it is turned to the discharging stop state under the condition that the cell temperature is higher than the preset value, and this state is defined as a discharging stop state based on abnormal temperature.

15. A battery pack according to claim 1, wherein the control means is operated in such manner that, in the discharging state, it is turned to the discharging stop state under the condition that the discharging current is higher than the preset value, and this state is defined as a discharging stop state based on abnormal current.

16. A battery pack according to claim 1 wherein said control means is operated in such manner that said state transition information is transmitted to the external host device at least once when there is a request or at a regular interval or when there is state transition.

17. A battery pack according to claim 1, wherein the control means counts the time elapsed since it has been turned to the current state and this count value is transmitted to the external host device.

* * * * *